Jan. 2, 1968 A. D. BAKER 3,361,915
ALTERNATORS

Filed Feb. 17, 1965 6 Sheets-Sheet 4

United States Patent Office 3,361,915
Patented Jan. 2, 1968

3,361,915
ALTERNATORS
Alfred Dickens Baker, Solihull, England, assignor to Joseph Lucas (Industries) Limited, Birmingham, England
Filed Feb. 17, 1965, Ser. No. 433,401
3 Claims. (Cl. 310—68)

This invention relates to alternators more particularly for use in road vehicles.

An alternator according to the invention comprises a casing, a rotor mounted for rotation within the casing and carrying a field coil, a stator surrounding the rotor and from which the output from the alternator is obtained through a full wave rectifier supported by the casing, brushes through which the field coil can be energised, and a voltage regulator assembly controlling flow of current to the field coil, said voltage regulator assembly being supported by the casing but removable therefrom.

An example of the invention as applied to a 3-phase alternator is illustrated in the accompanying drawings, in which.

Figure 1:
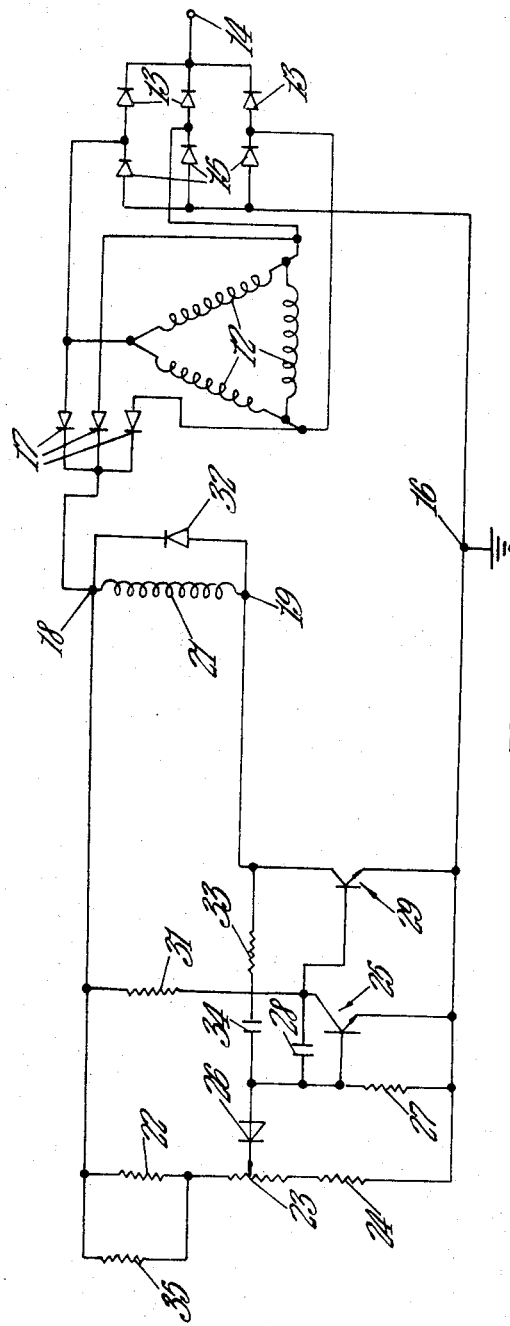
FIGURE 1 is a circuit diagram illustrating the alternator, full wave rectifier and voltage regulator.

Referring first to FIGURE 1, the alternator includes three delta connected stator windings 12 the phase points of which are connected respectively to the anodes of three diodes 13 having a common cathode connection to the live alternator output terminal 14, and are also connected respectively to the cathodes of three diodes 15 having a common anode connection to the earthed alternator output terminal 16. The phase points are further connected through the anodes and cathodes of three diodes 17 to a slip ring 18 which, together with a slip ring 19, provides a path through which current is supplied to the field winding 21 of the alternator under the control of a voltage regulator.

The voltage regulator includes three resistors 22, 23, 24 connected between the terminals 18, 16, a variable point on the resistor 23 being connected to the base of a transistor 25 through a Zener diode 26. The transistor 25 has its base connected to terminal 16 through a resistor 27, its emitter connected to terminal 16, its base and collector interconnected through a capacitor, and its collector connected to the base of a power transistor 29 and, through a resistor 31, to the terminal 18. The slip rings 18, 19 are bridged by a diode 32 which is connected in the full wave rectifier, not in the regulator, and the transistor 29 has its emitter connected to the terminal 16, and its collector connected to the base of the transistor 25 through a resistor 33 and capacitor 34 in series.

The operation of FIGURE 1 is as follows: the alternator output is rectified by diodes 13, 15 and applied between terminals 14, 16 to which the vehicle battery is connected. Also, the alternator output voltage is applied between terminals 18, 16, and as long as this voltage is below a set value transistor 29 conducts and current flows in winding 21. When the set value is exceeded, Zener diode 26 conducts and provides base current to transistor 25, which conducts and removes the base current from transistor 25. By virtue of the feedback path 33, 34, the transistors 25, 29 oscillate to provide pulsed current to winding 21 at a mark-space ratio determined by the current flow through the Zener diode 26. The capacitor 28 minimises radio interference. Preferably, a thermistor 35 is connected across resistor 22 to compensate for temperature changes. The thermistor 35 is accommodated in a convenient position where the temperature is to be sensed, for example close to the battery.

Figure 2:
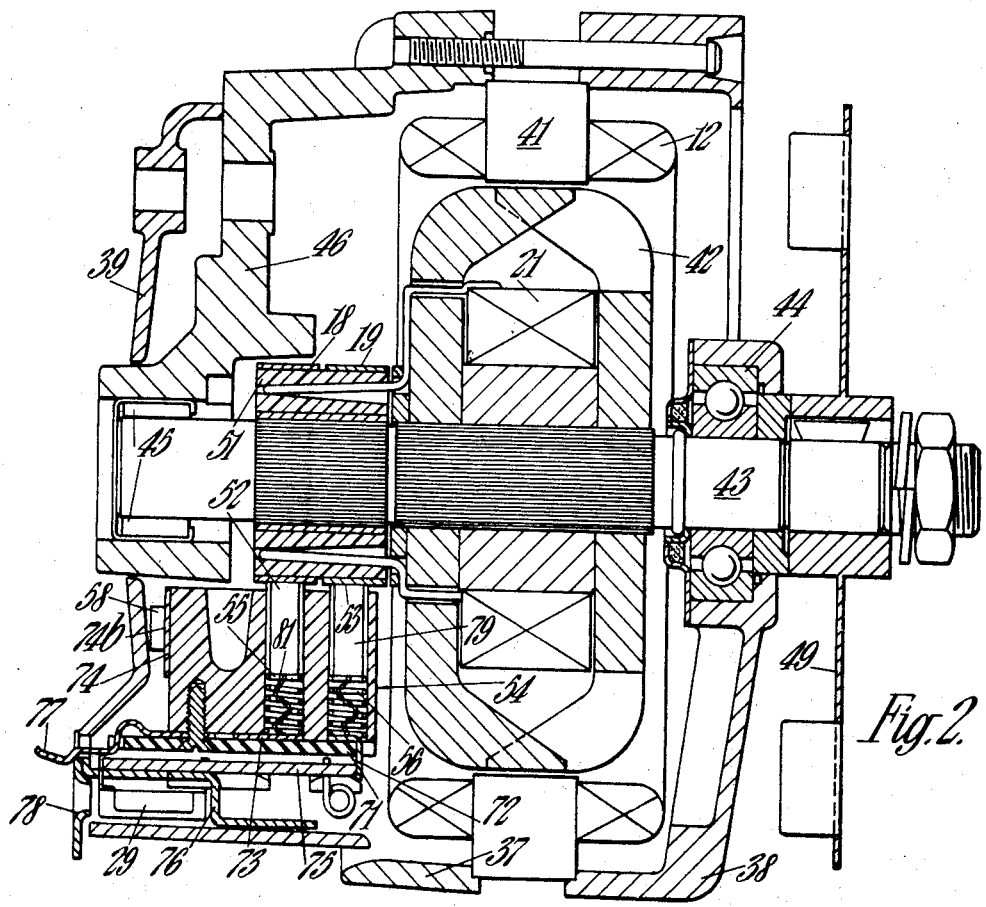
FIGURE 2 is a sectional side view of the alternator showing the voltage regulator mounting but omitting the rectifier mounting.
Figure 6:
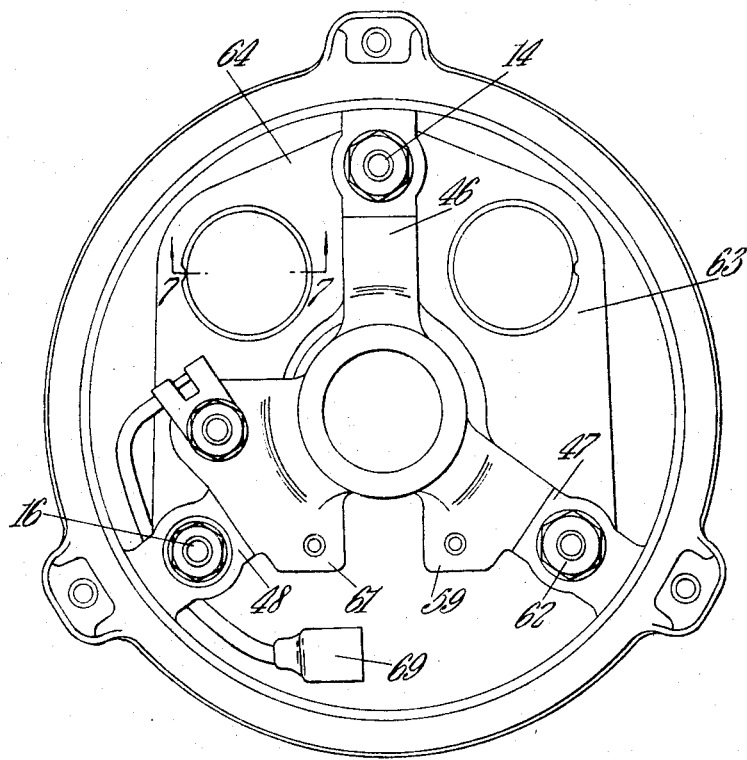
FIGURE 6 is a view on the left hand end of FIGURE 2.

Considering now the construction of the alternator, reference is first directed to FIGURE 2. The alternator includes a casing having a pair of interconnected parts 37, 38 and a detachable cover 39. The casing carries the stator 41 with its windings 12, and an associated imbricated rotor 42 which carries the winding 21 and is mounted on a shaft 43 journalled for rotation in the casing. For this purpose, one end of the shaft is journalled in a bearing 44 carried by the part 38, and the other end of the shaft is journalled in a bearing 45 carried by arms 46, 47, 48 (FIGS. 4 and 6) extending inwardly from the part 37 and angularly spaced by 120°. A fan 49 is mounted on the shaft 43 adjacent the bearing 44 for drawing air through the casing.

The slip rings 18, 19 are carried by a unit 51 having a splined connection with the shaft 43, and are connected to opposite ends of the winding 21. Connections with the rings 18, 19 are made by brushes 52, 53 respectively carried in slots in a moulded brush box 54 and loaded by springs 55, 56 into engagement with the rings 18, 19. The box 54 has lugs 57 (FIG. 10) through which the box is secured by screws 58 to lugs 59, 61 (FIGS. 4 and 6) integral with the arms 47, 48 respectively.

Referring now to FIGURES 3 to 8, which illustrates in detail the arrangement of the full wave rectifier and the diodes 17, the terminal 14 is constituted by a post extending through the arm 46, but insulated therefrom, and the terminal 16 is constituted by a post extending through the arm 48 and connected thereto to provide an earthed connection through the casing. A third post 62 extends from the arm 47 and is insulated therefrom. All three posts extend through holes in the cover 39.

Figure 3:
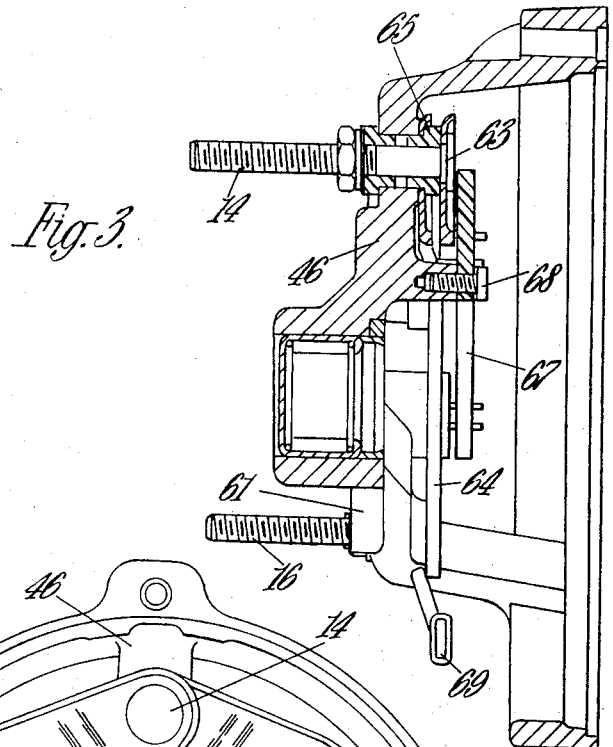
FIGURE 3 is a sectional side view of one end of the alternator with the rotor, cover, and voltage regulator omitted, but showing the rectifier mounting.

Extending between the posts 14, 62 is an electrically conductive link 63 which is in contact with the post 14 so as to be electrically connected thereto as shown in FIGURE 3, the link 63 being insulated from the casing by virtue of its connection to the insulated post 62. Moreover, a second electrically conductive link 64 extends between the posts 14, 16, the link 64 being in contact with the post 16 but insulated from the post 14 by a bush 65 (FIG. 3).

Figure 7:
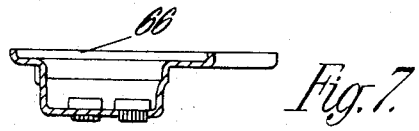
FIGURE 7 is a section on the line 7—7 in FIGURE 6.

The link 63 supports the diodes 13, whilst the diodes 15 are supported by the link 64. The diodes can be supported in a number of ways, for example as indicated in FIGURE 7 in which the diodes are accommodated in a recess in the link with one terminal of each diode resting on and so electrically connected to the link, and the other terminal of the diodes having connected thereto a lead extending through an insulator 66 closing the recess. The diodes 13 have their cathodes connected to the link 63 so that the link forms the connection from their cathodes to the terminal post 14. Similarly, the diodes 15 have their anodes connected to the link 64 and thus to the terminal post 16.

Figure 4:
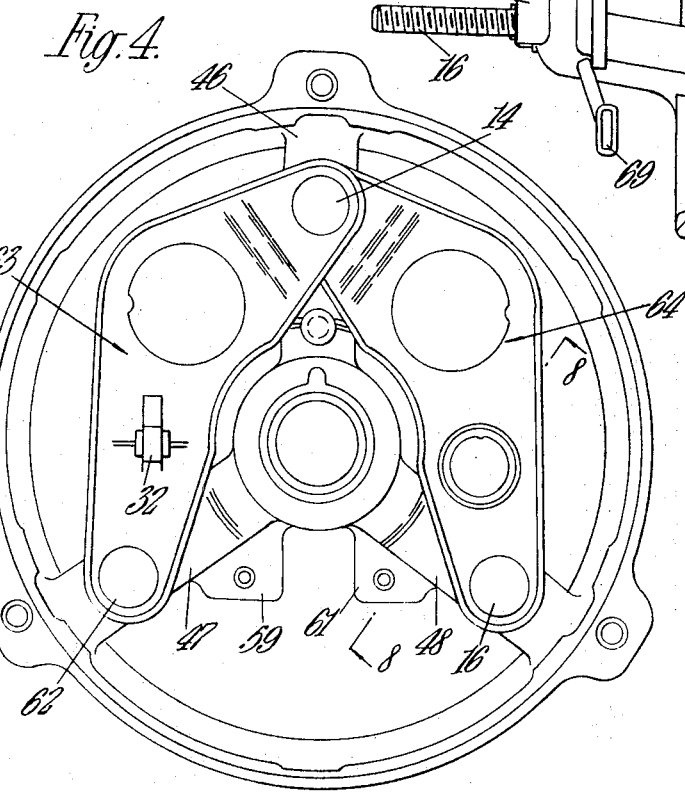
FIGURE 4 is a view on the right hand end of FIGURE 3 with the stator and printed circuit board omitted.
Figure 8:
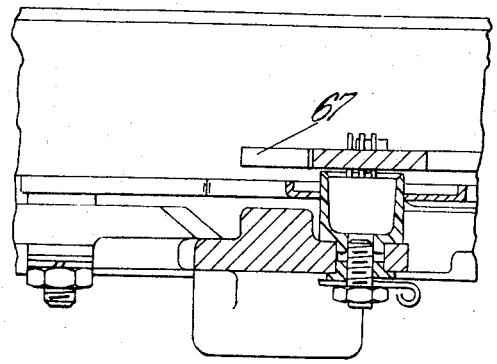
FIGURE 8 is a section on the line 8—8 in FIGURE 4.

The diodes 17 are also carried by the link 64 as shown in FIGURES 4 and 8 but are insulated therefrom. A common connection is made from the cathodes of the diodes 17 to a connector 69 which is connected to the voltage regulator in a manner to be described. Moreover, the diode 32 is supported by the link 63 but insulated therefrom.

Figure 5:
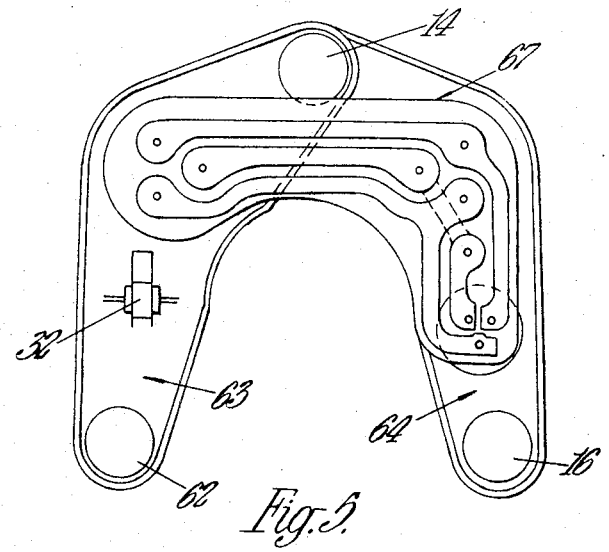
FIGURE 5 is a view of part of FIGURE 3 showing the printed circuit board in position.

The required connections between the diodes 13, 15 and 17 are made by a printed circuit board 67 secured to the link 63 by a screw 68 (FIGURE 3). As shown in FIGURE 5, the board 67 has three conductive portions which interconnect the diodes in the manner shown in FIGURE 1, these portions being formed with terminals connected by leads (not shown) to the phase points of the windings 12.

Figure 9:
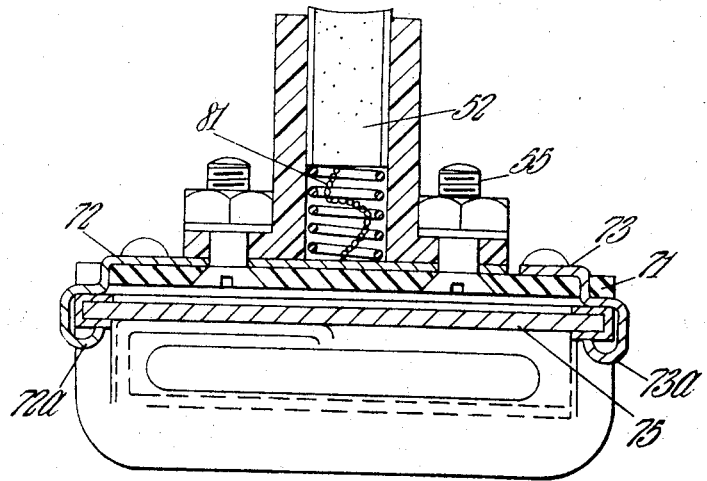
FIGURE 9 is an end view of part of FIGURE 2 with the cover removed, and parts in section.
Figure 10:
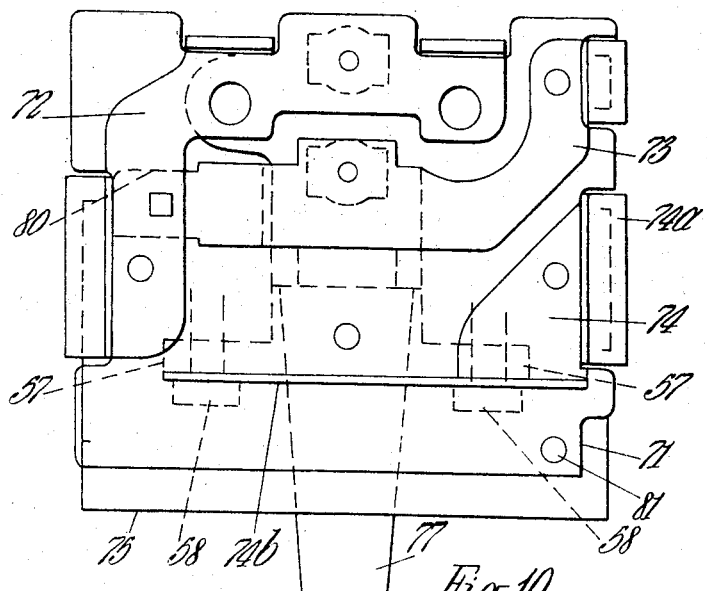
FIGURE 10 is a view of the underside of the regulator with the positions of the printed circuit board and insulating plate shown in outline only.

Referring now to FIGURES 2, 9 and 10, secured to the underside of the box 54 is an insulating plate 71 to which are secured three electrically conductive strips 72, 73, 74. The strips 72, 73, 74 are formed with integral channels 72a, 73a, 74a, (FIGURES 9 and 10) shaped to receive as a sliding fit a printed circuit board 75 forming part of the voltage regulator assembly. This assembly comprises the board 75, which carries all the components of the regulator except the thermistor and the power transistor 29, which is mounted on a heat sink 76 secured to the board 75. The assembly slides into the channels 72a, 73a, 74a through an aperture in the cover 39, and is retained by a clip 77 secured to the box 54. The heat sink 76 is formed with an aperture 78 which directs cooling air past the transistor 29, and also forms a handle for use in moving the assembly.

When the voltage regulator assembly is in position, three connections on the board are made automatically through the channels 72a, 73a, 74a to the points 19, 18, 16 in FIGURE 1. Thus, the strip 72 is connected through a connector 79 to the brush 53 and thence to slip ring 19, and the strip 73 is formed with a terminal 80 (FIG. 10) which engages the connector 69 to provide the connection with the diodes, the strip 73 also being connected through a connector 81 to the brush 52 and thence to slip ring 18. The strip 74 has an upstanding portion 74b connected to the arms 47, 48 by the screws 58, and thence to the earthed terminal post 16. The remaining connection with the components in the assembly are made on the printed circuit board with the exception of the thermistor 35, which is connected between post 62 and a terminal point 81 on the board 75.

It will be appreciated that the arrangement described enables voltage regulator assemblies to be readily interchanged.

Having thus described my invention what I claim as new and desire to secure by Letters Patent is:

1. An alternator comprising in combination a casing; a rotor; means mounting said rotor for rotation within said casing; a field coil carried by said rotor; a pair of slip rings carried by said rotor; means connecting said slip rings to opposite ends of said field coil; a brush box carried by said casing; a pair of brushes supported by said brush box in engagement with said slip rings respectively; a stator surrounding said rotor; windings carried by said stator from which the output of the alternator is obtained; a pair of output terminals; a full wave rectifier supported by the casing and coupling said output terminals to said stator windings; three terminal strips supported relative to said casing; a voltage regulator assembly including a power transistor through which current flows to said field coil, a printed circuit board carrying the components of the voltage regulator and making connections therebetween, and a heat sink carried by said printed circuit board, said heat sink carrying said power transistor; means connecting one of said terminal strips to said casing to earth said strip; and means connecting the other two strips to said brushes respectively; said terminal strips making electrical connections to said voltage regulator assembly; and said voltage regulator assembly controlling the current flow to said field coil to control the output of the alternator.

2. An alternator as claimed in claim 1 in which said terminal strips are carried by said brush box.

3. An alternator as claimed in claim 1 in which said full wave rectifier comprises a first link supported by said casing and connected to one of said output terminals, a second link supported by the casing and connected to the other of said output terminals, a first set of diodes supported by said first link with their cathodes interconnected electrically through said first link, a second set of diodes supported by said second link with their anodes interconnected electrically through said second link, and a printed circuit board having terminal portions connected to phases of said stator windings, said printed circuit board interconnecting said diodes to provide said full wave rectifier.

References Cited

UNITED STATES PATENTS

| | | | |
|---|---|---|---|
| 3,059,169 | 10/1962 | Raver | 322—73 |
| 3,072,840 | 1/1963 | Jones | 322—73 |
| 3,299,303 | 1/1967 | Newill | 322—28 |
| 3,299,342 | 1/1967 | Rath | 322—75 |
| 3,300,709 | 1/1967 | Short | 322—73 |
| 3,295,046 | 12/1966 | Margaira | 310—68 |
| 3,271,601 | 9/1966 | Raver | 310—68 |

MILTON O. HIRSHFIELD, *Primary Examiner.*

J. D. MILLER, *Examiner.*